(12) United States Patent
Fischer et al.

(10) Patent No.: US 6,689,838 B1
(45) Date of Patent: Feb. 10, 2004

(54) MOLDING COMPOUNDS WITH REDUCED ADHESIVENESS USE IN THE AUTOMOBILE INDUSTRY

(75) Inventors: Michael Fischer, Ludwigshafen (DE); Walter Rau, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/018,476

(22) PCT Filed: Jun. 23, 2000

(86) PCT No.: PCT/EP00/05866
§ 371 (c)(1), (2), (4) Date: Dec. 19, 2001

(87) PCT Pub. No.: WO01/00729
PCT Pub. Date: Jan. 4, 2001

(30) Foreign Application Priority Data

Jun. 25, 1999 (DE) .......................... 199 29 302

(51) Int. Cl.$^7$ ............................... C08L 53/00
(52) U.S. Cl. ............................ 525/88; 525/63; 525/69; 525/230; 525/233
(58) Field of Search ............................ 525/88, 63, 69, 525/230, 233

(56) References Cited

U.S. PATENT DOCUMENTS

| 4,749,755 A | * | 6/1988 | Buysch et al. ............... 525/438 |
| 5,219,915 A | | 6/1993 | McKee et al. |
| 6,444,753 B1 | * | 9/2002 | Mangnus et al. ............. 525/88 |

FOREIGN PATENT DOCUMENTS

| DE | 197 50 627 | 5/1999 |
| EP | 392 357 | 10/1990 |
| WO | 99/25770 | 3/1999 |

OTHER PUBLICATIONS

Patent Abstract DE 19750627.

* cited by examiner

Primary Examiner—James J. Seidleck
Assistant Examiner—Olga Asinovsky
(74) Attorney, Agent, or Firm—Keil & Weinkauf

(57) ABSTRACT

The invention relates to a molding composition comprising, based on the total of components A to G, which is 100% by weight, a) as component A of the molding composition, from 1 to 99,59% by weight of at least one polycondensate, b) as component B, from 0.1 to 20% by weight of at least one particulate graft copolymer with a glass transition temperature of the soft phase below 0° C. and with a median particle size of from 50 to 1000 nm, c) as component C, from 0.1 to 20% by weight of at least one copolymer made from the following monomers
   c1) as component C1, from 50 to 90% by weight of at least one vinylaromatic monomer, and
   c2) as component C2, from 10 to 50% by weight of acrylonitrile and/or methacrylonitrile, in each case based on component C, d) as component D, from 0 to 20% by weight of a copolymer similar to component C, where the content in % by weight of acrylonitrile and/or methacrylonitrile in component C differs from that in component D, e) as component E, from 0.1 to 20% by weight of a polyester other than component A, f) as component F, from 0.01 to 10% by weight of at least one nucleating agent and of at least one transesterification stabilizer, where the ratio by weight of nucleating agent to transesterification stabilizer is from 1:100 to 100:1, and g) as component G, from 0.1 to 10% by weight of customary additives, such as carbon black, UV stabilizers, oxidation retarders, lubricants and mold-release agents, and to moldings, products, recycled materials and laminates produced from the same, and to the use of these.

15 Claims, No Drawings

MOLDING COMPOUNDS WITH REDUCED ADHESIVENESS USE IN THE AUTOMOBILE INDUSTRY

The invention relates to molding compositions, moldings, products, recycled materials, and also laminates, and to the use of these.

Moldings made from polymeric materials and used in particular in the interior of motor vehicles have to meet high requirements, especially in relation to their mechanical properties, their surface properties, their aging performance, and also their emission performance or odor performance. Various polymeric materials have been used hitherto for producing moldings for automotive construction and automotive interior applications.

One material used is ABS. This material has poor UV resistance, poor heat-aging resistance and poor heat resistance (Vicat B softening point <110° C.).

Another material used is ABS/PC (a polymer blend made from acrylonitrile/butadiene/styrene copolymer and polycarbonate). However, this material has inadequate UV resistance, poor heat-aging performance (toughness and elongation at break after heat-aging), poor environmental stress cracking resistance, for example with respect to plasticizer, poor flowability, and also in particular poor emission properties and poor odor performance. For the purposes of the present invention, odor performance is the tendency of materials to release volatile constituents with detectable odor after the material has been stored for a specified time under particular conditions of temperature and of humidity.

Another material used is ABS/PA (a polymer blend made from ABS and polyamide). ABS/PA, too, has poor UV resistance, poor heat resistance (Vicat B softening point <110° C.), poor heat-aging resistance, poor dimensional stability due to high moisture absorption, and also poor flowability.

Another material used is PPE/HIPS (a polymer blend made from polyphenylene oxide and impact-modified polystyrene). Disadvantages of this material are poor flowability, poor UV resistance, foam adhesion and heat-aging resistance, and also its poor odor performance.

Use is also made of PET/PC (a polymer blend made from polyethylene terephthalate and polycarbonate). Disadvantages of this material are poor environmental stress cracking resistance, for example with respect to plasticizers, and also its poor flowability.

Another material used is PBT/PC, which has poor flowability and environmental stress cracking resistance.

Most of the abovementioned materials have poor heat resistance, expressed in terms of a low Vicat B softening point (Vicat B <130° C.), and also poor heat-aging resistance. However, good heat resistance and heat-aging resistance are essential in the materials used, since the interior of a motor vehicle can be subject to considerable heating, in particular when exposed to insolation.

The materials currently available also have shortcomings for external applications. For example, blends made from PPE and PA have poor dimensional stability due to moisture absorption, and poor processibility.

It has been possible to remove the abovementioned disadvantages using polymeric materials based on PBT/ASA/PSAN (polymer blends made from polybutylene terephthalate, acrylonitrile/styrene/acrylate copolymer and polystyrene/acrylonitrile copolymer). A general disclosure of materials of this type is made in DE-A 39 11 828. The examples relate to molding compositions with high acrylonitrile content in the PSAN copolymers. However, moldings made from these molding compositions, like the majority of the abovementioned materials, have poor emission performance and odor performance.

In addition, when processed by injection molding these polymeric materials have disadvantages. Freshly produced injection moldings have relatively high adhesion to the mold walls, for example due to incomplete crystallization. This relatively high adhesion makes it necessary to provide the surfaces of the injection molds with appropriate adhesion-reducing agents, in order to avoid unnecessary prolongation of the cycle times for the individual injection-molding procedures as a result of the tendency of the molding composition to adhere. Another way of keeping the cycle time very low is to admix adhesion-reducing agents with the molding composition itself. However, the use of adhesion-reducing agents either in the injection mold, or else in the molding composition itself, mostly causes undesirable deposits on the surface of the injection mold, and these have, for example, an adverse effect on the surface of the molding. The cycle time is defined as the period from injection of the melt of the molding composition to demolding of the injection molding. The cycle time has a direct effect on the number of units produced on each injection molding plant, and therefore on the cost of the injection molding. It is, of course, possible to reduce the tendency of the molding composition to adhere by cooling the injection molds. However, this is firstly attended by high technical costs and secondly means that cooling has to be repeated for each cycle, and over a large number of cycles the attendant temperature variations bring about relatively rapid materials fatigue in the injection mold, which then has to be replaced more frequently.

It is an object of the present invention to provide molding compositions suitable for producing moldings Which are used in the interior of motor vehicles and for exterior body parts and have an advantageous property profile with respect to their mechanical, optical and surface properties, and also in particular have good heat resistance and heat-aging resistance and good emission performance and/or odor performance. The molding compositions should also have very low density. The low density is particularly advantageous with regard to fuel saving in motor vehicles. The moldings should also be easy to recycle. A further object is to reduce the adhesion of the molding compositions in injection molding and to avoid any impairment of the other properties as a result of this reduction. A further object is that there should be very little need to cool the surface of the injection mold in order to remove the molding from the mold. A further object is that the amount of adhesion-reducing agent used on the surface of the injection mold and, respectively, in the molding composition should be kept very low, especially so that no deposits of this adhesion-reducing agent develop on the surface of the injection mold.

We have found that this object is achieved by a molding composition comprising, based on the total of components A to G, which is 100% by weight, a) as component A of the molding composition, from 1 to 99.59% by weight of at least one polycondensate, b) as component B, from 0.1 to 20% by weight of at least one particulate graft copolymer with a glass transition temperature of the soft phase below 0° C. and with a median particle size of from 50 to 1000 nm, c) as component C, from 0.1 to 20% by weight of at least one copolymer. made from the following monomers
   c1) as component C1, from 50 to 90% by weight of at least one vinylaromatic monomer, and c2) as component C2, from 10 to 50% by weight of acrylonitrile and/or methacrylonitrile, in each case based on component C, d) as component D, from 0 to 20% by weight of a copolymer similar to component C, where the content in % by weight of acrylonitrile and/or methacrylonitrile in component C differs from that in component D, e) as component E, from 0.1 to 20% by weight of a polyester other than component A, f) as component F, from 0.01 to 10% by weight of at least one nucleating agent and of at least one transesterification stabilizer, where the ratio by weight of nucleating agent to transesterification stabilizer is from 1:100 to 100:1, preferably from 1:10 to 10:1 and particularly preferably from 1:3 to 3:1, and g) as component G, from 0.1 to 10% by weight of customary additives, such as carbon black, UV stabilizers, oxidation retarders, lubricants and mold-release agents.

Each of the components differs from the others and is described in detail below.

The novel molding composition comprises, as complementary constituent component A, up to 99.59% by weight based on the molding composition, preferably from 20 to 75% by weight, particularly preferably from 30 to 60% by weight, of a preferably fusible polycondensate, preferably of a polyester and particularly preferably of an aromatic polyester. The polycondensates present in the novel molding compositions are known per se. It is preferable for the polycondensates to have a viscosity number (VN) of from 40 to 170, preferably from 80 to 140 and particularly preferably from 100 to 135.

The polyester may preferably be prepared by reacting terephthalic acid, its esters or other ester-forming derivatives, with 1,4-butanediol, 1,3-propanediol or, respectively, 1,2-ethanediol, in a manner known per se.

Up to 20 mol % of the terephthalic acid may be replaced by other dicarboxylic acids. Those which may be mentioned, merely as examples, are naphthalene-dicarboxylic acids, isophthalic acid, adipic acid, azelaic acid, sebacic acid, dodecanedioic acid and cyclohexanedicarboxylic acids, mixtures of these carboxylic acids, and ester-forming derivatives of the same.

Up to 20 mol % of the dihydroxy compounds 1,4-butanediol, 1,3-propanediol or, respectively, 1,2-ethanediol may also be replaced by other dihydroxy compounds, e.g. 1,6-hexanediol, 1,4-hexanediol, 1,4-cyclohexanediol, 1,4-di(hydroxymethyl)cyclohexane, bisphenol A, neopentyl glycol, mixtures of these diols, or also ester-forming derivatives of the same.

Other preferred aromatic polyesters are polytrimethylene terephthalate (PTT) and in particular polybutylene terephthalate (PBT), whose formation involves exclusively terephihalic acid and the appropriate diols 1,2-ethanediol, 1,3-propariediol and 1,4-butanediol. Some or all of the aromatic polyesters may be used in the form of recycled polyester materials, such as PET regrind from bottle material or from wastes from bottle production.

In a particularly preferred embodiment, component A is composed of a1) from 50 to 100% by weight, preferably from 80 to 100% by weight, particularly preferably from 90 to 100% by weight, of polybutylene terephthalate and of a2) from 0 to 50% by weight, preferably from 0 to 20%, particularly preferably from 0 to 10% by weight, of another polycondensate.

In a further embodiment of the invention, the molding composition does not comprise any PET. Preferred molding compositions are moreover those in which component A is free from PET.

The novel molding composition comprises, as component B, from 1 to 20% by weight, preferably from 2 to 8% by weight, particularly preferably from 2.5 to 7% by weight, in particular from 3 to 6% by weight, of at least one particulate graft copolymer with a glass transition temperature of the soft phase below 0° C. and with a median particle size of from 50 to 1000 nm.

Component B is preferably a graft copolymer made from b1) from 50 to 90% by weight of a particulate graft base B1 with a glass transition temperature below 0° C., and b2) from 10 to 50% by weight of a graft B2 made from the following monomers b21) as component B21, from 50 to 90% by weight of a vinylaromatic monomer, and b22) as component B22, from 10 to 50% by weight of acrylonitrile and/or methacrylonitrile.

The particulate graft base B1 may be composed of from 70 to 100% by weight of a $C_1$–$C_{10}$ conjugated diene; preferably of a $C_1$–$C_{10}$-alkyl acrylate, and from 0 to 30% by weight of a bifunctional monomer having two non-conjugated olefinic double bonds. Graft bases of this type are used, for example, as component B in ABS polymers or MBS polymers.

In a preferred embodiment of the invention, the graft base B1 is composed of the following monomers:

b11) as component B11, from 75 to 99.9% by weight of a $C_1$–$C_{10}$-alkyl acrylate, b12) as component B12, from 0.1 to 10% by weight of at least one polyfunctional monomer having at least two non-conjugated olefinic double bonds, and b13) as component B13, from 0 to 24.9% by weight of one or more other copolymerizable monomers.

The graft base B1 is an elastomer whose glass transition temperature is preferably below –20° C., particularly preferably below –30° C.

The main monomers B11 used to prepare the elastomer are acrylates having from 1 to 10 carbon atoms, in particular from 4 to 8 carbon atoms, in the alcohol component. Particularly preferred monomers B11 are isobutyl acrylate and n-butyl acrylate, and also 2-ethylhexyl acrylate, particularly preferably butyl acrylate.

Besides the acrylates, the crosslinking monomer B12 used is from 0.1 to 10% by weight, preferably from 0.1 to 5% by weight, particularly preferably from 1 to 4% by weight, of a polyfunctional monomer having at least two non-conjugated olefinic double bonds. Examples of these are divinylbenzene, diallyl fumarate, diallyl phthalate, triallyl cyanurate, triallyl isocyanurate, tricyclodecenyl acrylate and dihydrodicyclopentadienyl acrylate, particularly preferably the latter two.

Besides the monomers B11 and B12, the structure of the graft base B1 may also involve up to 24.9% by weight, preferably up to 20% by weight, of other copolymerizable monomers, preferably 1,3-butadiene, styrene, α-methylstyrene, acrylonitrile, methacrylonitrile and $C_1$–$C_8$-alkyl methacrylates, or mixtures of these monomers. In a particularly preferred embodiment no 1,3-butadiene is present in the graft base B1, and the graft base B1 is composed in particular exclusively of components B11 and B12.

Grafted onto the graft base B1 there is a graft B2 made from the following monomers:

b21) as component B21, from 50 to 90% by weight, preferably from 60 to 90% by weight, particularly preferably from 65 to 80% by weight, of a vinylaromatic monomer, and b22) from 10 to 50% by weight, preferably from 10 to 40% by weight, particularly preferably from 20 to 35% by weight, of acrylonitrile or methacrylonitrile or mixtures of these.

Examples of vinylaromatic monomers are unsubstituted styrene and substituted styrenes, such as α-methylstyrene, p-chlorostyrene and p-chloro-α-methylstyrene. Preference is given to unsubstituted styrene and α-methylstyrene, particularly preferably unsubstituted styrene.

In one embodiment of the invention the median particle size of component B is from 50 to 200 nm, preferably from 55 to 150 nm.

In another embodiment of the invention the median particle size of component B is From 200 to 1000 nm, preferably from 400 to 550 nm.

In a particularly preferred embodiment of the invention component B has bimodal particle size distribution and is composed of from 10 to 90% by weight, preferably from 30 to 90% by weight, particularly preferably from 50 to 75% by weight, of a small-particle graft copolymer with a median particle size of from 50 to 200 nm, preferably from 55 to 150 nm, and of from 10 to 90% by weight, preferably from 10 to 70% by weight, particularly preferably from 25 to 50% by weight, of a large-particle graft copolymer with a median particle size of from 250 to 1000 nm, preferably from about 400 to 550 nm.

The median particle size and particle size distribution given are the sizes determined from the integral mass distribution. The median particle sizes according to the invention ate in all cases the ponderal median of the particle sizes. The determination of these is based on the method of W. Scholtan and H. Lange, Kolloid-Z. und Z.-Polymere 250 (1972), pages 782–796, using an analytical ultracentrifuge. The ultracentrifuge measurement gives the integral mass distribution of particle diameters in a specimen. From this it is possible to deduce what percentage by weight of the particles has a diameter identical to or smaller than a particular size. The median particle diameter, which is also termed the $d_{50}$ of the integral mass distribution, is defined here as the particle diameter at which 50% by weight of the particles have a diameter smaller than that corresponding to the $d_{50}$. Equally, 50% by weight of the particles then have a larger diameter than the $d_{50}$. To describe the breadth of the particle size distribution of the rubber particles, $d_{10}$ and $d_{90}$ values given by the integral mass distribution are utilized alongside the $d_{50}$ value (median particle diameter). The $d_{10}$ and $d_{90}$ of the integral mass distribution are defined similarly to the $d_{50}$, with the difference that they are based on, respectively, 10 and 90% by weight of the particles. The quotient $$(d_{90}-d_{10})/d_{50}=Q$$

is a measure of the breadth of the particle size distribution. Emulsion polymers A which can be used according to the invention as component A preferably have Q less than 0.5, in particular less than 0.35.

The graft copolymer B generally has one or more stages, i.e. it is a polymer composed of a core and of one or more shells. The polymer is composed of a base (graft core) B1 and of, grafted onto this, one, or preferably more than one, stages B2, known as grafts or graft shells.

By grafting one or more times it is possible to apply one or more graft shells to the rubber particles. Each graft shell may have a different makeup. In addition to the grafting monomers, polyfunctional crosslinking monomers or monomers containing reactive groups may be grafted on (see, for example, EP-A 0 230 282, DE-A 36 01 419, EP-A 0 269 861).

In one embodiment of the invention, crosslinked acrylate polymers with a glass transition temperature below 0° C. serve as graft base B1. The crosslinked acrylate polymers should preferably have a glass transition temperature below −20° C., in particular below −30° C.

In principle the structure of the graft copolymer may also have two or more layers, where at least one inner layer should have a glass transition temperature below 0° C. and the outermost layer should have a glass transition temperature above 23° C.

In a preferred embodiment, the graft B2 is composed of at least one graft shell. The outermost graft shell of these has a glass transition temperature above 30° C. A polymer formed from the monomers of the graft B2 would have a glass transition temperature above 80° C.

Suitable preparation processes for graft copolymers B are emulsion, solution, bulk and suspension polymerization. The graft copolymers B are preferably prepared by free-radical emulsion polymerization, at temperatures of from 20 to 90° C. using water-soluble and/or oil-soluble initiators, such as peroxodisulfate or benzoyl peroxide, or with the aid of redox initiators. Redox initiators are also suitable for polymerization below 20° C.

Suitable emulsion polymerization processes are described in DE-A-28 26 925, DE-A 31 49 358 and in DE-C-12 60 135.

The graft shells are preferably built up in the emulsion polymerization process as described in DE-A-32 27 555, 31 49 357, 31 49 358 and 34 14 118. The specified setting of the particle sizes according to the invention at from 50 to 1000 nm preferably takes place by the methods described in DE-C-12 60 135 and DE-A-28 26 925, or in Applied. Polymer Science, Vol. 9 (1965), page 2929. The use of polymers with different particle sizes is known, for example, from DE-A-28 26 925 and U.S. Pat. No. 5,196,480.

The novel molding compositions comprise, as component C, from 0.1 to 20% by weight, preferably from 5 to 15% by weight, particularly preferably from 8 to 12% by weight, of a copolymer made from the following monomers:

c1) as component C1, from 50 to 90% by weight, preferably from 75 to 90% by. weight, particularly preferably from 85 to 80% by weight, of at least one vinylaromatic monomer, and c2) as component C2, from 10 to 50% by weight, preferably from 10 to 25% by weight, and in particular from 15 to 19% by weight, of acrylonitrile and/or methacrylonitrile.

Suitable vinylaromatic monomers are the abovementioned monomers C1 and the vinylaromatic monomers mentioned above as component B21. Component C is preferably an amorphous polymer as described above for graft B2. In one embodiment of the invention, component C comprises a copolymer of styrene and/or α-methylstyrene with aciylonitrile. The acrylonitrile content in these copolymers of component C here is not above 25% by weight and is generally from 10 to 25% by weight, preferably from 10 to 22% by weight, particularly preferably from 10 to 19% by weight, in particular from 15 to 19% by weight.

In another embodiment of a copolymer of component C, this is preferably a styrene/acrylonitrile copolymer, an α-methylstyrene/acrylonitrile copolymer or an α-methylstyrene/styrene/acrylonitrile terpolymer. It is important that the acrylonitrile content in these copolymers C does not exceed 25% by weight, in particular 19% by weight, and is at least 1% by weight. The copolymers may be used for component C either individually or as a mixture, and the additional and separately prepared component C of the novel molding compositions may, for example, be a mixture of a styrene/acrylonitrile copolymer (PSAN) and an $\alpha$-methylstyrene/acrylonitrile copolymer. The acrylonitrile content of the different copolymers of component C may also vary. However, component C is preferably composed simply of one or more styrene/acrylonitrile copolymers, which may have differing acrylonitrile contents. In a particularly preferred embodiment, component C is composed simply of one styrene/acrylonitrile copolymer.

The novel molding compositions comprise, as component D, from 0 to 20% by weight, preferably from 0.1 to 12.5% by weight, particularly preferably from 5 to 7.5% by weight, of a copolymer similar to that in component C, where the content in % by weight of acrylonitrile and/or methacrylonitrile, preferably acrylonitrile, is different in components C and D. The content of acrylonitrile and/or methacrylonitrile in the copolymer of component D is preferably higher than that in component C.

In one embodiment of the invention, the component D used is a copolymer of styrene and/or $\alpha$-methylstyrene with acrylonitrile. The acrylonitrile content in these copolymers of component D here is above 25% by weight, generally from >25 to 40% by weight and in particular from >25 to 35% by weight.

In another embodiment of a copolymer of component D, this is preferably a styrene/acrylonitrile copolymer, an $\alpha$-methylstyrene/acrylonitrile copolymer or an $\alpha$-methylstyrene/styrene/acrylonitrile terpolymer. Here, too, it is preferable for the content of acrylonitrile in these copolymers to be from >25 to 40% by weight and preferably from >25 to 35% by weight. The copolymers may be used individually or as a mixture for component D, with the result that the additional, separately prepared component D in the novel molding compositions may be a mixture made from a styrene/acrylonitrile copolymer (PSAN) with an $\alpha$-methylstyrene/acrylonitrile copolymer, for example. The acrylonitrile content of the various copolymers of component D may also differ. However, component D is preferably composed of just one, or of two or more, styrene/acrylonitrile copolymers, where the copolymers may have a different content of acrylonitrile. In one particularly preferred embodiment, component D is composed of just one styrene/acrylonitrile copolymer.

The novel molding composition also comprises, as component E, based on the entire molding composition, from 0.1 to 20% by weight, preferably from 0.1 to 15% by weight and particularly preferably from 0.1 to 10% by weight, of a polyester other than component A. The polyester of component E has at least 50% by weight, preferably at least 70% by weight and particularly preferably 100% by weight, based on component E, of polyethylene terephthalate (PET). Other preferred polyesters of component E are the aromatic polyesters defined above. The PET used may either come directly from synthesis or else be a recycled material, preferably made from PET bottle regrind. The use of recycled PET material is of interest firstly for cost reasons and secondly due to the action of the recycled PET material in improving the toughness of the molding composition. The PET used according to the invention in component E is therefore with preference composed of at least 50% by weight, preferably at least 80% by weight, and particularly preferably 100% by weight, of recycled PET material.

The novel molding composition also comprises, as component F, from 0.01 to 10% by weight, preferably from 0.02 to 5% by weight, and particularly preferably from 0.05 to 2% by weight, of at least one nucleating agent and of at least one transesterification stabilizer, where the ratio of nucleating agent to transesterification stabilizer is from 0:1 to 1:10, preferably from 5:1 to 1:5 and particularly preferably from 2.5:1 to 1:2.5.

In the novel molding composition it is preferable for the nucleating agent in component F to be a particulate solid with a particle size of from 0.1 to 15 $\mu$m, or for the transesterification stabilizer to be at least one phosphorus-containing compound, or for the nucleating agent to be a predominantly inorganic, particulate solid with a particle size of from 0.1 to 15 $\mu$m and for the transesterification stabilizer to be at least one phosphorus-containing compound.

Compounds of this type which form the transesterification stabilizer may be either organic or inorganic phosphorus compounds. Preferred organic phosphorus compounds are in particular organic phosphites. A phosphite of this type is tetrakis(2,4-di-tert-butylphenyl) bisphenyldiphosphite (Irgaphos® PEPQ from Ciba Geigy AG). Inorganic phosphorus compounds which may be used are in particular inorganic phosphates, such as monozinc phosphates, in particular in the form of mono- or dihydrate, or mixtures of these, and particular preference is given to monozinc phosphate dihydrate. The amount of the transesterification catalyst used is preferably from 0.01 to 5% by weight, with preference from 0.05 to 2% by weight and particularly preferably from 0.1 to 0.3% by weight, based on the molding composition.

The term "transesterification stabilizer" has a meaning equal to the meaning of the terms "transesterification protection" and "transesterification inhibitor", respectively, used in the technical terminology.

The mechanism of action of such transesterification inhibitors is that they deactivate residues of the catalysts, which is required in the synthesis of polyesters. Such catalysts are organotitanium compounds as, for example, alkyl titanates. These compounds are able to activate ester groups via free coordination sites and to initiate transesterification reactions. In this connection copolyesters are formed which are characterized in that they have a lower crystallinity, which fact enhances the undesired tendency of adhesion of the injectionmoulded parts to the mould when they are removed from the mould. When using the above described transesterification inhibitors they are dative-bonded to the titanate; the resulting Zn/Ti complex is inactive with regard to the ester groups.

The particulate solid for the nucleating agent may be either predominantly organic or else predominantly inorganic, and the inorganic materials are preferred. Examples of predominantly organic materials are especially sodium phenylphosphinate and polytetrafluoroethylene. The inorganic materials may be divided into two groups, specifically into aluminum- and silicon-based materials and particular preference is given to the silicon-based materials, in particular those based on silicon oxides. Besides silicon-based materials, magnesium-containing materials have proven particularly successful here. Talc is therefore particularly preferred as nucleating agent. The novel molding composition preferably comprises from 0.01 to 5% by weight, with preference from 0.02 to 1% by weight and particularly preferably from 0.05 to 0.2% by weight, of nucleating agents.

Use may also be made of component F to reduce the adhesion of the novel molding compositions. In particular, the adhesion of the molding compositions to the surface of injection molds is reduced. It is particularly preferable for there to be a reduction of the adhesion within the range of the processing temperature of the novel molding composition, and particularly within the temperature range prevailing during injection molding, from 200 to 300° C., preferably from 250 to 300° C.

An advantage associated herewith is that firstly it is not essential to add any adhesion-reducing agents to the molding composition, and for example the amount added may be less than 0.5% by weight, based on the molding composition, and that secondly there is no need for the surface of the injection mold to be provided with adhesion-reducing agents.

Adhesion-reducing agents of this type for use in molding compositions of this type are known to the skilled worker, but it is preferable for there to be no adhesion-reducing agents used in the injection molding procedure or in the molding composition.

The novel molding compositions comprise, as component G, from 0.1 to 10% by weight of conventional additives. Examples of additives of this type are: UV stabilizers, oxidation retarders, lubricants, mold-release agents, dyes, pigments, colorants, antistats, antioxidants, stabilizers to improve thermal stability, to increase light stability, to raise hydrolysis resistance and chemical resistance, agents to prevent decomposition by heat, and in particular the lubricants useful for producing moldings. These other additives may be metered in at any stage of the preparation process, but preferably at an early juncture so as to make use at an early stage of the stabilizing effects (or other specific effects) of the additive. Heat stabilizers or oxidation retarders are usually metal halides (chlorides, bromides or iodides) derived from metals in group I of the Periodic Table of the Elements (for example Li, Na, K or Cu).

Suitable stabilizers are the usual hindered phenols, or else vitamin E or compounds of similar structure. HALS stabilizers (hindered amine light stabilizers) are also suitable, as are benzophenones, resorcinols, salicylates, benzotriazoles and other compounds (for example Irganox®, Tinuvin®, such as Tinuvin® 770 (HALS absorbers, bis(2,2,6,6-tetramethyl-4-piperidyl) sebacate) or Tinuvin® P (UV absorber—(2H-benzotriazol-2-yl)-4-methylphenol) or Topanol®). The amounts of these usually used are up to 2% by weight based on the entire mixture.

Suitable lubricants and mold-release agents are stearic acid, stearyl alcohol, stearic esters and in general higher fatty acids, derivatives of these and appropriate mixtures of fatty acids having from 12 to 30 carbon atoms. The amounts of these additives are from 0.05 to 1% by weight.

Other possible additives are silicone oils, oligomeric isobutylene, or similar substances. The usual amounts are from 0.05 to 5% by weight. It is also possible to use pigments, dyes, color brighteners, such as ultramarine blue, phthalocyanines, titanium dioxide, cadmium sulfides and derivatives of perylenetetracarboxylic acid.

The amounts used of processing aids and stabilizers, such as UV stabilizers, lubricants and antistats, are usually from 0.01 to 5% by weight, based on the entire molding composition.

It is advantageous to add up to about 5% by weight, based on the molding composition, of plasticizers, such as dioctyl phthalate, dibenzyl phthalate, butyl benzyl phthalate, hydrocarbon oils, N-(n-butyl)benzenesulfonamide, or o- or p-tolueneethylsulfonamide. It is possible to add amounts of up to about 5% by weight,based on the molding composition, of colorants, such as dyes or pigments.

It is also preferable for the novel molding composition to have a component G with a copolymer which contains no butadiene derivative or no isoprene derivative, or neither of these.

The novel molding compositions comprise, as component H, from 0 to 30% by weight, based on their own weight, preferably from 0 to 20% by weight and particularly preferably from 0.1 to 12% by weight, of a polycarbonate. Suitable polycarbonates are any of those known to the skilled worker, and fusible polycarbonates are particularly suitable. In this connection reference is made to "Polymer Chemistry, An Introduction", 2nd Edition, Malcolm P. Stevens Oxford University Press, 1990, pp. 400–403 and "Principles of Polymerisation", 2nd Edition, George Odian, Wiley Interscience Publications, John Wiley and Sons, 1981, pp. 146–149. Particularly suitable polycarbonates have high flowability, preferably an MVR of >9cm$^3$/10min, with preference >13 cm$^3$/10 min and particularly preferably >20 cm$^3$/10 min at 300° C. and 1.2 kp. Preferred components H have an MVR according to ISO 1133 of not more than 100 cm$^3$/10 min, preferably not more than 90 cm$^3$/10 mn and particularly preferably not more than 50 cm$^3$/10 min. A particularly preferred component H is Lexan 121R from General Electric Plastics. The use of recycled PC material in the form of either "post-industrial" or "post-consumer" recycled material has proven particularly suitable, since it processes particularly well. In a preferred embodiment of the invention the molding composition is polycarbonate-free.

The novel molding composition may also comprise, as component H, from 0 to 30% by weight, based on its own weight, of a polycarbonate and, as component I, from 0.1 to 100% by weight, based on its own weight, preferably from 1 to 50% and particularly preferably from 10 to 30%, of a fiber or in one embodiment may comprise both.

Fibers of this type generally have an average length of from 0.1 to 0.5 mm, preferably from 0.1 to 0.4 mm, and a diameter of from 6 to 20 $\mu$m. Preference is given to glass fibers and mineral fibers, in particular glass fibers, preferably made from E glass. To achieve better adhesion, the fibers may have been coated with organosilanes, with epoxy silanes or with other polymeric coatings.

The components may be mixed in any known manner using any known methods. The components may be mixed as they stand or else in the form of mixtures of one of the components with one or more of the other components. For example, component B may be premixed with some or all of components C or D and then mixed with the other components. If components B, C and D have been prepared by, for example, emulsion polymerization it is possible to mix the resultant polymer dispersions with one another and then to precipitate the polymers together and work up the polymer mixture. However, it is preferable for components B, C and D to be blended by extruding, kneading or milling the components together, components B, C and D having previously been isolated, if required, from the aqueous dispersion or solution obtained during the polymerization. The novel thermoplastic molding compositions may, for example, be prepared by mixing component A with each of components B, C and D or with a mixture made from these, and, where appropriate, mixing with the other components, melting in an extruder and introducing the fibers via an inlet to the extruder.

The novel molding compositions may be processed by thermoplastic processes known per se, to give moldings. In particular, they may be produced by thermoforming, extrusion, injection molding, calendering, blow molding, compression molding, sintering or pressure sintering, preferably by injection molding. The moldings produced from the molding compositions of the invention are likewise provided by the present invention.

The moldings produced from the novel molding compositions have only low emissions of volatile constituents with detectable odor. The odor performance of polymeric materials is assessed to DIN 50011/PV 3900 and applies to components for the interiors of motor vehicles. In the case of the novel moldings, the result of the odor test to this Standard is generally better than grade 5, preferably better than grade 4.5 and particularly preferably better than grade 4. The carbon emission from the moldings to PV 3341 is generally <50 µg/g, preferably <40 µg/g, particularly preferably <35 µg/g. The lower limit is preferably 20 µg/g.

The novel moldings also have good heat resistance. The Vicat B softening point is generally >120° C., preferably >125° C. and particularly preferably, 130° C. The upper limit of the Vicat B softening point is preferably 160° C.

The novel moldings also have good impact strength, even in cold conditions. This is seen from the fact that the moldings formed from the novel molding compositions do not fracture, even at low temperatures.

The modulus of elasticity of the fiber-reinforced moldings is preferably >2000 MPa, with preference >3500 MPa, and not more than 1500 MPa, their yield stress is generally >40 MPa, preferably >70 MPa, but preferably not more than 150 MPa, they do not fracture when their impact strength is tested to ISO 179/1eU, and their impact strength is preferably from 30 to 80 kJ/m$^2$, and their flowability as MVR (melt volume rate 275° C./2.16 kp applied force to ISO 1133) is >10 cm$^3$/10 min, preferably >15 cm$^3$/10 min, but not more than 30 cm$^3$/10 min.

The novel moldings do not show any splintering in the penetration test at −30° C. (2 and 3 mm plaque diameter, to ISO 6603/2), even after heat-aging at 130° C. for 1000 h.

According to the invention moreover the specific gravity of the molding composition is from 1.1 to 1.5, preferably from 1.2 to 1.4 and particularly preferably from .12 to 1.3.

One embodiment of the invention is given by moldings with one or more of the features i) to vii)

i) PV 3341 carbon emission <50 µg of carbon/g;
ii) a grade better than 5 as the result of the DIN 50 011/PV 3900 odor test;
iii) Vicat B softening point >120° C.;
iv) density of from 1.1 to 1.5 g/cm$^3$;
v) flowability, as melt volume rate at 275° C. and 2.16 kp to ISO 1133, of >10 cm$^3$/10 min;
vi) reduction in impact strength to ISO 179/1eU after 1000 h of heat-aging at 1,20° C. of <30% compared with the value prior to heat-aging;
vii) elongation at break to DIN 53457>2% after 1000 h of heat-aging at 130° C.

The invention also provides a laminate which comprises a novel molding and a polycondensate foam. It is advantageous for there to be a firm bond, via their surfaces, between the molding and the polycondensate foam. The laminates have excellent adhesion between the foam and the surface of the molding, without any need for pretreatment of this surface, for example by a primer. When the foam is pulled away or peeled away from the surface of the molding, cohesive fracture is observed: residues of foam remain on the surface. The polycondensate foam used may be any of the foamable polycondensates known to the skilled worker. In another embodiment of the invention it is preferable for the foam to be applied to the surfaces of the molding without using a primer. Preferred polycondensates here are polyamides and polyurethanes, particularly preferably polyurethanes. Among the polyurethane foams, particular preference is in turn given to semirigid and flexible foams, which may, if desired, comprise adhesion promoters. A particular polyurethane foam used is Elastoflex® from Elastogran GmbH, Lemförde, Germany. Other suitable polyurethanes may be found in Kunststoffhandbuch Vol. 7, Polyurethane, 3rd edition, 1993, Karl Hanser Verlag, Munich, Vienna.

The novel molding compositions and the resultant moldings or products are also suitable for recycling. The recycled materials obtained from the novel molding compositions or moldings can be reprocessed to give moldings which have at least one of the material properties described above. Based on the molding, the amount. of recycled material in moldings of this type made from recycled material is at least 10% by weight, preferably at least 20% by weight and particularly preferably at least 70% by weight. The recycling takes place by processes well known to the skilled worker. In particular, the novel molding compositions make comminution and thermal recycling of the moldings easier. In this context particular preference is given to diene-free molding compositions.

Basically, the process of recycling the structural parts consisting of the moulding compound according to the invention may be carried out in two alternative ways:

(a) a step of recycling the material (material recycling), i.e. the polymer material is recovered in a pure form and is supplied to steps of processing the polymers with simultaneous melting as, for example, steps of extrusion moulding, press moulding or injection molding; or, (b) a step of recycling the polymer chemically (raw material recycling) through hydrolysis or pyrolysis of the polymer material and subsequent destillative and/or extractive working-up under conditions generally known to a person skilled in this technical field. The raw materials thus recovered may be employed in further processes.

When recycling the composites according to the invention or the structural parts formed thereof, respectively, a precondition of the recycling step sequence are usual process steps like a step of disassembling the materials easy to separate as well as of removing fixing elements (fittings), a step of peeling-off the polyurethane foams (if such foams were applied to the composites of the invention), steps of crushing, separating an classifying, further processing steps as mixing and homogenizing in apparatus suitable for such steps and steps of cleaning and removing dust under process conditions generally known to a person skilled in this field. Such steps are followed by steps of processing the polymer thus obtained in a manner described above.

The properties described above, in particular the heat-aging resistance and the heat resistance, make the molding compositions, moldings, laminates or recycled materials according to the invention, or any two or more of these, suitable for use in products, in particular for applications in the interior of motor vehicles or for exterior body parts of motor vehicles.

The invention also provides products preferably for the interior of motor vehicles for exterior body parts of motor vehicles and comprising molding compositions, moldings, laminates or recycled materials according to the invention, or any two or more of these.

It is particularly preferable for the novel moldings or products to be laser-markable.

Preferred novel moldings or products for the interior of motor vehicles are therefore protective coverings, storage compartments, dashboard supports, door breasts, parts for the center console, and also retaining elements for radio and air-conditioning system, covers for the center console, covers for radio, air-conditioning system and ashtray, prolongations of the center console, storage pockets, storage areas for the driver's door and the passenger's door, storage areas for the center console, components for the driver's and passenger's seats, such as seat coverings, light-switch housings, lamp housings, housings for: the vehicle's electronic system, for example the ABS electronics, ASC electronics, stability control electronics, gearbox electronics, seat electronics, mirror motor electronics, window-lifter motor electronics, retractable-roof electronics, airbag triggering electronics, seat-occupation detection electronics, passenger-compartment safety electronics, acceleration-sensor electronics or ignition electronics, and multipoint connectors, plug connectors, lock-system housings, protective covers for wiper housings, lock housings, and also roof racks, defroster ducts, internal mirror housings, sun-roof elements, such as sun-roof frames, covers and protective surrounds for instruments, instrument sockets, upper and lower shells for the steering column, air ducts, air blowers and adapters for personal air-flow devices and defroster ducts, door side coverings, coverings in the knee area, air-outlet nozzles, defroster apertures, switches and levers. These applications are merely examples of possible applications in motor vehicle interiors and are not limited to applications in motor vehicle interiors.

Preferred moldings or products for exterior body parts are moreover in particular fenders, tailgates, side paneling, bumpers, other paneling, identification plate supports, panels, sunroofs, sunroof frames, and also impact protectors and constituents of these.

Other applications which may be mentioned merely by way of example for other moldings or products not restricted to the motor vehicle sector are boat hulls, lawnmower housings, garden furniture, motorcycle parts, camera cases, cases for mobile telephones, tube sections for binoculars, vapor ducts for vapor-extraction hoods, parts for pressure cookers, housings for hot-air grilles and pump housings.

By comparison with the abovementioned moldings or products, the use of the molding compositions has proven particularly successful in the case of plug connectors, housing parts, in particular for the electronic systems of motor vehicles, particularly ABS/ASR electronics, ESP gearbox electronics, seat electronics, mirror motor electronics, window lifter motor electronics, retractable roof electronics, airbag triggering electronics, passenger compartment safety electronics, accelerator sensor electronics or ignition electronics, or else in the electronics for detecting seat occupation. Other preferred uses of the novel molding compositions are locking system housings, autorelays, and covers for wiper housings, and also for lock housings.

Another preferred group of moldings or products which can be produced from the novel molding compositions is that of gas meter housings, wind deflectors, actuating-motor housings, where the actuating motors are preferably used in automotive construction, parts for power drills, parts for ovens, in particular to insulate from heat, for example knobs and oven handles, screen wiper parts, in particular wiper blade mountings, spoilers, mirror support plates for motor vehicle mirrors, and housings for washing machine control systems.

The novel molding compositions are also suitable for other moldings used in the household sector, preferably in the kitchen sector. These include bread-baking machines, toasters, table grills, kitchen machinery, electric tin-openers and juice presses. In these articles it is preferably the switches, housings, handles and covers which are produced from the novel molding compositions. The novel molding compositions may also be used for moldings in stoves, preferably stove handles, stove knobs and switches.

The novel molding compositions may also be used in moldings which meet the requirements of the Federal Drug Administration or of comparable national authorities in other countries. In this sector particular preference is given to packaging for pharmaceutical products and packs for pharmaceutical kits.

The novel molding compositions may also be used in the food and drink packaging sector. Preference is given here to moldings such as boxes, pots, dishes and other types of container made from the novel molding compositions.

When considering the uses for the novel molding compositions, particular emphasis should be given to their safety in contact with food and drink and to their resistance to fats and liquids, particularly advantageous in parts for household devices.

The use of the molding compositions defined above has proven particularly successful in producing moldings which are highly heat-resistant. Particular moldings of this type are headlamp parts used in the vicinity of the headlamp, in which the temperature when the headlamp is operating can exceed 100° C., preferably 110° C. and particularly preferably 130° C., but is not more than 200° C. Parts of this type may either be glass-fiber-reinforced or not glass-fiber-reinforced.

The advantage of using the novel molding compositions is in particular that no matting of the surface occurs in headlamp parts of this type with a reflecting, metalized surface. The result of using the novel molding compositions is that, even after prolonged operation of the headlamp, there are no deposits on the transparent areas of the headlamp which transmit the light, and the reflective properties of metalized surfaces of these moldings are retained. The novel molding compositions may also be used for producing other headlamp components. These headlamp components include in particular headlamp housings, headlamp frames, headlamp retainers and headlamp guides, preference being given to headlamp frames.

The other advantageous properties of the novel molding compositions, such as low cycle times, no mold-deposit formation during injection molding, and also excellent quality of the metalized surfaces, are, furthermore, retained.

In particular, no clouding of the metalized surface occurs on heating the molding to from 100 to 200° C., preferably from 110 to 180° C. and particularly preferably from 130 to 170° C., and moldings may therefore be obtained which have metalized surfaces with long-lasting reflective properties.

The use of the novel molding compositions has also proven successful in producing large-surface-area moldings which are comparatively thin in relation to their surface area and for which excellent demolding performance is demanded. Particular large-surface-area moldings of this type are sunroof rails, body parts, air inlet grilles, dashboard parts such as dashboard supports, protective covers, air ducts, add-on parts, in particular for the center console, a part of the glove compartment, and protective surrounds for tachometers.

The examples below illustrate the invention in greater detail:

EXAMPLE

Example and Comparative Example

As shown by the data in Table 1 below, the stated amounts of polybutylene terephthalate (PBT), graft rubbers P1 and P2, PSAN copolymers and additives were mixed in a screw extruder at from 250 to 270° C. The resultant molding compositions were used to injection mold the test specimens appropriate for the relevant DIN standards.

PBT is a polybutylene terephthalate with a viscosity number of 130 (determined in a polymer solution (0.05 g/ml) in phenol and 1,2-dichloromethane (1:1)).

Glass fiber (chopped glass made from standard glass)

P1 is a small-particle ASA graft rubber with 25% by weight of acrylonitrile in the SAN graft shell and with a median particle size of about 100 nm.

PSAN 33 is a styrene/acrylonitrile copolymer with 33% by weight of acrylonitrile.

PSAN 19 is a styrene/acrylonitrile copolymer with 19% by weight of acrylonitrile.

Mold-release agent is Loxiol VPG 861/3,5 from Henkel.

Nucleating agent is IT Extra talc.

Transesterification stabilizer is monozinc phosphate dihydrate.

Carbon black is Black Pearls 880.

Table 2 gives the results of the tests carried out.

TABLE 1

Precise mixing specifications (data in % by weight)

| Starting material | Reference | Molding composition I |
|---|---|---|
| PBT (VN 130) | 48 | 47.7 |
| Glass fiber | 20 | 20 |
| PET | 10 | 10 |
| ASA | 10 | 6 |
| PSAN 33 | 11 | 5 |
| PSAN 19 | | 10 |
| Loxiol | 0.5 | 0.5 |
| Nucleating agent | | 0.1 |
| Transesterification stabilizer | | 0.2 |
| Carbon black | 0.5 | 0.5 |

TABLE 2

Tests on injection molded specimens to DIN/ISO:

| Property | Unit | Reference | Molding composition I |
|---|---|---|---|
| MVR 275/2.16 | $cm^3$/10 min | 18 | 22 |
| ISO 179/1eU | $kJ/m^2$ | 49 | 48 |
| ISO 179/1eA | $kJ/m^2$ | 6.7 | 7.0 |
| Modulus of elasticity | MPa | 6850 | 7400 |
| Yield stress | MPa | 103 | 118 |
| Elongation at break | % | 2.4 | 2.4 |
| Penetration energy | Nm | 2.5 | 3.5 |
| HDT B | ° C. | 208 | 212 |
| Surface | | good | good |
| Minimum cycle time* | s | 20 | 12.5 |

*The cycle time was determined on a demolding strip (strip with 40 short ribs). The dimensions of the molding were as follows:
Volume: 20 $cm^3$
Dimensions: 135 × 50 × 12 mm
Wall thickness: 2.0 mm
Sprue gate
Injection/mold temperature: 270/80° C.

The cooling time, and thus the cycle time, is reduced until the molding with its ribs remains behind adhering to the mold. The fact that the molding remains behind adhering to the mold is an unambiguous criterion for evaluation. The minimum cycle time is the time which still just makes it possible for the moldings to demold.

We claim:
1. A molding composition comprising, based on the total of component A to C and E to G, which is 100% by weight,
   a) as component A of the molding composition, from 1 to 99.59% by weight of at least one polyester,
   b) as component B, from 0.1 to 20% by weight of at least one particulate graft copolymer made from
      b1) from 50 to 90% by weight of a graft base B1 with a glass transition temperature below 0° C., and
      b2) from 10 to 50% by weight of a graft B2 made from the following monomers
         b21) as component B21, from 50 to 90% by weight of a vinylaromatic monomer, and
         b22) as component B22, from 10 to 50% by weight of acrylonitrile and/or methacrylonitrile,
      as component B,
   c) as component C, from 0.1 to 20% by weight of at least one copolymer made from the following monomers
      c1) as component C1, from 50 to 90% by weight of at least one copolymer made from the following monomers.
      c2) as component C2, from 10 to 50% by weight of acrylonitrile and/or methacrylonitrile, in each case based on component C,
   e) as component E, from 0.1 to 20% by weight of a polyester other than component A,
   f) as component F, from 0.01 to 10% by weight of at least one nucleating agent and of at least one transesterification stabilizer, where the ratio by weight of nucleating agent to transesterification stabilizer is from 1:100 to 100:1, and
   g) as component G, from 0.1 to 10% by weight of customary additives, including carbon black, UV stabilizers, oxidation retarders, lubricants and mold-release agents.

2. A molding composition as claimed in claim 1, wherein in component F the nucleating agent is a particulate solid with a particle size of from 0.1 to 15 μm, or the transesterification stabilizer is at least one phosphorus-containing compound, or the nucleating agent is a particulate solid with a particle size of from 0.1 to 15 μm and the transesterification stabilizer is at least one phosphorus-containing compound.

3. A molding composition as claimed in claim 1, where this additionally comprises, as component H, from 0 to 30% by weight, based on its own weight, of a polycarbonate and, as component I, from 0.1 to 100% by weight, based on its own weight, of a fiber.

4. A molding composition as claimed in claim 3, where the polycarbonate of component H has a flowability expressed as melt volume rate at 300° C. with 1.2 kp to ISO 1133 of from 9 to 100 $cm^3$/10 min.

5. A molding composition as claimed in claim 1, where component A is composed of
   a1) from 50 to 100% by weight of polybutylene terephthalate, and of
   a2) from 0 to 50% by weight of another polycondensate.

6. A molding composition as claimed in claim 1, where component B is composed of
   b1) from 50 to 90% by weight of a particulate graft base B1 made from the following monomers
      b11) as component B11, from 75 to 99% by weight of a $C_1$–$C_{10}$-alkyl acrylate,
      b12) as component B12, from 0.1 to 10% by weight of at least one polyfunctional monomer having at least two non-conjugated olefinic double bonds, and b13) as component B13, from 0 to 24% by weight of one or more other copolymerizable monomers, and of b2) from 10 to 50% by weight of a graft B2 made from the following monomers
- b21) as component B21, from 50 to 90% by weight of a vinylaromatic monomer, and
- b22) as component B22, from 10 to 50% by weight of acrylonitrile and/or methacrylonitrile.

7. A molding composition as claimed in claim 1, where component B is composed of from 10 to 90% by weight of a small-particle graft copolymer with a median particle size of from 50 to 200 nm and of from 10 to 90% by weight of a large-particle graft copolymer with a median particle size of from 250 to 1000 nm.

8. A molding comprising molding compositions as claimed in claim 1.

9. A molding as claimed in claim 8, with on or more of the features i) to vii)
- i) PV 3341 carbon emission <50 μg of carbon/g;
- ii) a grade better than 5 as result of the DIN 50 011/PV 3900 order test;
- iii) Vicat B softening point >120° C.;
- iv) density of from 1.1 to 1.5 g/cm$^3$;
- v) flowability, as melt volume rate at 275° C. and 2.16 kp to ISO 1133, of >10 cm$^3$/10;
- vi) reduction in impact strength to ISO 179/1eU after 100 h of heat-aging at 120° C. of <30% compared with the value prior to heat-aging;
- vii) elongation at break to DIN 53457>2% after 1000 h of heat-ageing at 130° C.

10. A laminate comprising a molding as claimed in claim 8 and a polycondensate foam.

11. A process for recycling a molding as in claim 8 which comprises
- a) crushing the molding
- b) separating from the crushed composition any optionally present foreign materials
- c) recovering the molding composition,
- d) homogenizing the recovered molding composition, and
- e) forming a new molding comprising said homogenized composition.

12. A molding as composition as prepared in claim 11.

13. A molding for the interior of motor vehicles or for external body parts of motor vehicles comprising recycled materials as claimed in claim 12.

14. A laminate comprising the molding of claim 12 and a polycondensate foam.

15. A molding for the interior of motor vehicles or for external body parts of motor vehicles, comprising molding compositions as claimed in claim 1.

* * * * *

UNITED STATES PATENT AND TRADEMARK OFFICE
CERTIFICATE OF CORRECTION

PATENT NO. : 6,689,838 B1
DATED : February 10, 2004
INVENTOR(S) : Fischer et al.

It is certified that error appears in the above-identified patent and that said Letters Patent is hereby corrected as shown below:

Title page,
Item [57], ABSTRACT,
Line 5, "99,59%" should be -- 99.59% --.

Column 16,
Lines 20-21, "copolymer made from the following monomers," should be
-- vinylaromatic monomer, and --.

Column 17,
Line 18, "on or more" should be -- one or more --.

Signed and Sealed this

Eighth Day of June, 2004

JON W. DUDAS
*Acting Director of the United States Patent and Trademark Office*